United States Patent
Desai et al.

(10) Patent No.: US 10,592,663 B2
(45) Date of Patent: Mar. 17, 2020

(54) TECHNOLOGIES FOR USB CONTROLLER STATE INTEGRITY PROTECTION

(71) Applicant: Intel Corporation, Santa Clara, CA (US)

(72) Inventors: Soham Jayesh Desai, Atlanta, GA (US); Pradeep Pappachan, Hillsboro, OR (US); Reshma Lal, Hillsboro, OR (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 15/856,573

(22) Filed: Dec. 28, 2017

(65) Prior Publication Data

US 2019/0042732 A1    Feb. 7, 2019

(51) Int. Cl.
*G06F 21/53* (2013.01)
*G06F 13/38* (2006.01)
*G06F 21/57* (2013.01)
*G06F 21/51* (2013.01)

(52) U.S. Cl.
CPC ............ *G06F 21/53* (2013.01); *G06F 13/382* (2013.01); *G06F 21/51* (2013.01); *G06F 21/572* (2013.01)

(58) Field of Classification Search
CPC ................................ G06F 21/51; G06F 21/53
See application file for complete search history.

(56) References Cited

U.S. PATENT DOCUMENTS

| | | | | |
|---|---|---|---|---|
| 6,219,736 B1* | 4/2001 | Klingman | ........... | G06F 13/4295 370/259 |
| 8,327,137 B1* | 12/2012 | Erb | ......... | G06F 21/53 713/164 |
| 8,402,180 B2* | 3/2013 | Fredriksen | ........... | G06F 13/385 710/33 |
| 10,073,977 B2* | 9/2018 | Pappachan | ............ | G06F 13/28 |
| 2008/0147980 A1* | 6/2008 | Peters | ................. | G06F 12/0862 711/133 |
| 2009/0236418 A1* | 9/2009 | Hsi | ......... | G06F 9/445 235/382 |
| 2009/0271557 A1* | 10/2009 | Hsu | ..................... | G06F 13/4027 710/315 |
| 2013/0262883 A1* | 10/2013 | Saunders | ............... | G06F 13/42 713/300 |

(Continued)

*Primary Examiner* — Ali Shayanfar
(74) *Attorney, Agent, or Firm* — Barnes & Thornburg LLP (57) ABSTRACT

Technologies for USB controller state integrity protection are disclosed. A computing device reserves an isolated memory region in system memory and programs a base address register of a USB controller with the address of the isolated memory region. The computing device locks the base address register from further chances. The USB controller may store controller state data in a scratchpad buffer located within the isolated memory region. Software executed by a processor may read controller state data from the scratchpad buffer. Secure routing hardware of the computing device controls access to the isolated memory region. The secure routing hardware may allow read and write access by the USB controller and read-only access by software executed by the processor. After storing the controller state data, the computing device may power down the I/O controller. Other embodiments are described and claimed.

22 Claims, 4 Drawing Sheets

(56) References Cited

U.S. PATENT DOCUMENTS

| | | | | |
|---|---|---|---|---|
| 2014/0225630 A1* | 8/2014 | Stethem | ............. | F41H 13/0018 |
| | | | | 324/691 |
| 2015/0095661 A1* | 4/2015 | Sell | .................... | G06F 12/1408 |
| | | | | 713/193 |
| 2017/0177854 A1* | 6/2017 | Gligor | ................ | G06F 9/45558 |
| 2017/0364707 A1* | 12/2017 | Lal | ......................... | G06F 13/20 |
| 2018/0024945 A1* | 1/2018 | Van de Waerdt | ....... | G06F 21/76 |
| | | | | 711/152 |
| 2018/0136967 A1* | 5/2018 | Asbe | ...................... | G06F 21/53 |

* cited by examiner

TECHNOLOGIES FOR USB CONTROLLER STATE INTEGRITY PROTECTION

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data for a given computing device while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Typical universal serial bus (USB) controllers may use a system memory buffer as a scratchpad, for example to cache state information or for other internal processes. The scratchpad buffers may be accessible by software with sufficient privileges, such as an untrusted operating system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
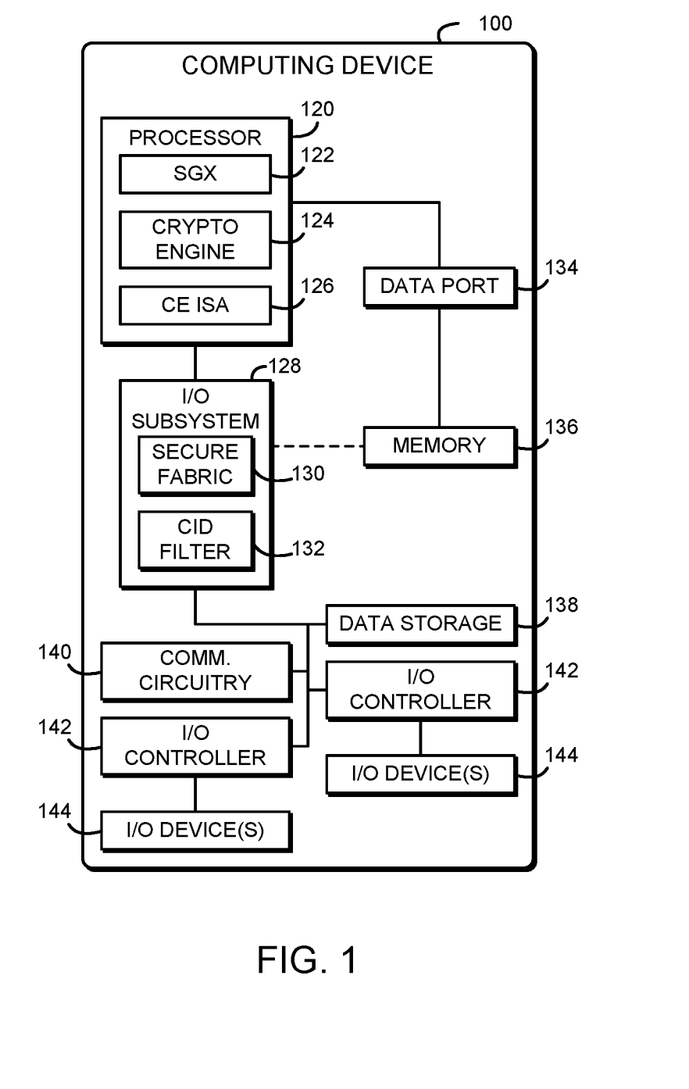
FIG. 1 is a simplified block diagram of at least one embodiment of a computing device for USB controller state integrity protection.

Referring now to FIG. 1, an illustrative computing device 100 for USB controller state integrity protection is shown. In use, as described further below, the computing device 100 configures an isolated memory region and programs a base address register of a USB controller with an address of the isolated memory region. Secure routing hardware of the computing device 100 allows read-write access by the I/O controller to the isolated memory region while allowing only read-only access by software to the isolated memory region. The USB controller may store controller state in a scratchpad buffer located in the isolated memory region, for example to store internal state data, to prepare for entering a low-power state, or for other purposes. Thus, the computing device 100 may allow the USB controller to access buffers stored in system memory while protecting the internal controller state data from modification by untrusted software. Because the isolated memory region is protected by hardware routing support, even privileged software such as an untrusted operating system may be prevented from modifying the scratchpad buffer. Accordingly, the computing device 100 may improve USB controller security, for example by preventing untrusted software from modifying controller state to gain access to certain I/O devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 136, a data storage device 138, and one or more I/O controllers 142. Additionally, in some embodiments, one or more of the illustrative components may be incorporated in, or otherwise form a portion of, another component. For example, the memory 136, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 136. The secure enclave support 122 may be embodied as a set of processor instruction extensions that allows the processor 120 to establish one or more secure enclaves in the memory 136. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 140. In particular, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 132, described further below. For example, the cryptographic engine ISA 126 may include processor features to bind programming instructions to the cryptographic engine 124 and/or the CID filter 132, unwrap bound programming instructions, securely clean the TIO PRM region of the memory 136, and/or securely copy and encrypt data from the TIO PRM region to a kernel I/O buffer. Additionally or alternatively, although illustrated as including trusted I/O capabilities, in some embodiments the computing device 100 may not include one or more components related to trusted I/O. For example, in some embodiments, the computing device 100 may not include the CID filter 132, the cryptographic engine 124, and/or the cryptographic engine ISA 126.

The memory 136 may be embodied as any type of volatile or non-volatile memory or data storage capable of performing the functions described herein. In operation, the memory 136 may store various data and software used during operation of the computing device 100 such as operating systems, applications, programs, libraries, and drivers. Further, the memory 136 may also include the TIO PRM region. The memory 136 is illustratively connected with a data port 134 to send and receive data from the processor 120 and the I/O subsystem 128. Additionally or alternatively, in some embodiments, the memory 136 may be communicatively coupled to the processor 120 via the I/O subsystem 128. The I/O subsystem 128 may be embodied as circuitry and/or components to facilitate input/output operations with the processor 120, the memory 136, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 136 may be directly coupled to the processor 120, for example via an integrated memory controller hub. The I/O subsystem 128 may further include a secure fabric 130. The secure fabric 130 provides secure routing support, which may include hardware support to ensure I/O data cannot be misrouted in the I/O subsystem 128 under the influence of rogue software. As described further below, the secure fabric 130 may be used with the CID filter 132 to provide cryptographic protection of I/O data. Additionally, in some embodiments, the I/O subsystem 128 may form a portion of a system-on-a-chip (SoC) and be incorporated, along with the processor 120, the memory 136, and other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 136.

The data storage device 138 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 140, which may be embodied as any communication circuit, device, or collection thereof, capable of enabling communications between the computing device 100 and other remote devices over a computer network (not shown). The communications subsystem 140 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 132 may be embodied as any hardware component, functional block, logic, or other circuit that performs CID filtering function(s), including filtering I/O transactions based on CIDs inserted by the I/O controllers 142. For example, the CID filter 132 may observe DMA transactions inline, perform test(s) based on the CID and memory address included in the transaction, and drop transactions that fail the test(s). In the illustrative embodiment, the CID filter 132 is incorporated in the I/O subsystem 128. In other embodiments, the CID filter 132 may be included in one or more other components and/or in an SoC with the processor 120 and I/O subsystem 128 as a separate component.

Each of the I/O controllers 142 may be embodied as any universal serial bus (USB) controller, embedded controller, microcontroller, microprocessor, functional block, logic, or other circuit or collection of circuits capable of performing the functions described herein. In some embodiments, one or more of the I/O controllers 142 may be embedded in another component of the computing device 100 such as the I/O subsystem 128 and/or the processor 120. Additionally or alternatively, one or more of the I/O controllers 142 may be connected to the I/O subsystem 128 and/or the processor 120 via an expansion bus such as PCI Express (PCIe) or other I/O connection. As described above, the I/O controllers 142 communicate with one or more I/O devices 140, for example over a peripheral communications bus (e.g., USB, Bluetooth, etc.). The I/O devices 140 may be embodied as any I/O device, such as human interface devices, keyboards, mice, touch screens, microphones, cameras, and other input devices, as well as displays and other output devices. As described above, the I/O controllers 142 and associated DMA channels are uniquely identified using identifiers called channel identifiers (CIDs). Each I/O controller 142 may assert an appropriate CID with every DMA transaction, for example as part of a transaction layer packet (TLP) prefix, to uniquely identify the source of the DMA transaction and provide liveness protections. The CID also enables the isolation of I/O from different devices 140.

Figure 2:
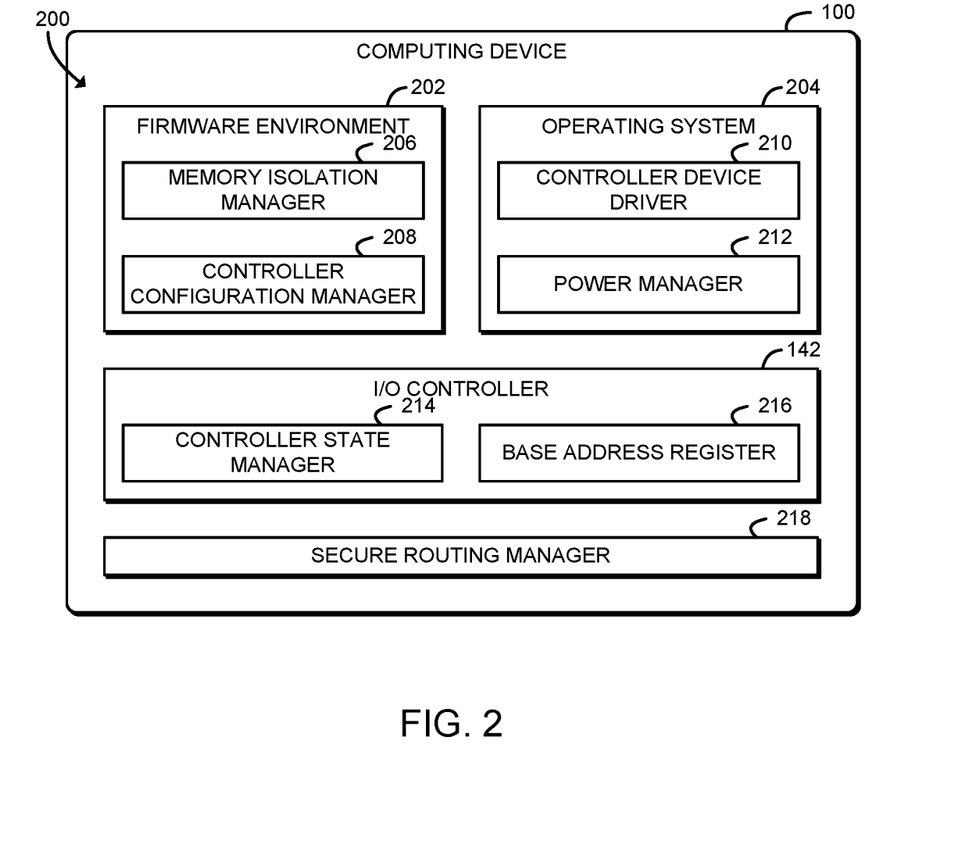
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment includes a firmware environment 202, an operating system 204, an I/O controller 142, and a secure routing manager 218. The firmware environment 202 includes a memory isolation manager 206 and a controller configuration manager 208. The operating system 204 includes a controller device driver 210 and a power manager 212. The I/O controller 142 includes a controller state manager 214 and a base address register 216. The various components of the environment 200 may be embodied as hardware, firmware, software, or a combination thereof. As such, in some embodiments, one or more of the components of the environment 200 may be embodied as circuitry or collection of electrical devices (e.g., memory isolation circuitry 206, controller configuration circuitry 208, controller device driver circuitry 210, power manager circuitry 212, controller state circuitry 214, and/or secure routing circuitry 218). It should be appreciated that, in such embodiments, one or more of the memory isolation circuitry 206, the controller configuration circuitry 208, the controller device driver circuitry 210, the power manager circuitry 212, the controller state circuitry 214, and/or the secure routing circuitry 218 may form a portion of the processor 120, the I/O subsystem 128, the I/O controller 142, and/or other components of the computing device 100. Additionally, in some embodiments, one or more of the illustrative components may form a portion of another component and/or one or more of the illustrative components may be independent of one another.

The firmware environment 202 may be embodied as an ACPI BIOS firmware, a UEFI firmware, or any other firmware environment executed by the processor 120 of the computing device 100. The firmware environment 202 may establish a pre-boot firmware execution environment in response to a platform reset of the computing device 100 (e.g., a cold boot, warm boot, or other platform reset). The firmware environment 202 may also install or otherwise make available one or more runtime services or other firmware methods that may be invoked by the operating system 204. The operating system 204 may be embodied as any operating system, hypervisor, virtual machine monitor, and/or other executive component of the computing device 100 that manages hardware of the computing device 100 and otherwise controls runtime execution of the computing device 100.

The memory isolation manager 206 is configured to reserve an isolated memory region in the memory 136 of the computing device 100. The controller configuration manager 208 is configured to program the base address register 216 of the I/O controller 142 with an address of the isolated memory region and to lock the base address register 216 after programming. The base address register 216 may be programmed by a trusted entity of the computing device 100, such as a trusted firmware component.

The controller state manager 214 is configured to store controller state data in a scratchpad buffer located in the isolated memory region in response to locking of the base address register 216. The controller state manager 214 is further configured to load the controller state data from the scratchpad buffer. The controller state data may be loaded in response to powering on the I/O controller 142.

The power manager 212 is configured to power down the I/O controller 142 in response to storing the controller state data in the memory 136, and is further configured to power on the I/O controller 142. The controller device driver 210 may be configured to load, by a software component executed by the computing device 100, the controller state data from the scratchpad buffer in response to storing the controller state data.

The secure routing manager 218 is configured to control, by secure routing hardware of the computing device 100 such as the secure fabric 130, access to the isolated memory region in response to storing the controller state data. Access may be controlled as a function of a security attribute of an initiator of the access to the isolated memory region. The security attribute of the initiator may include an identity of the initiator and/or a role of the initiator (e.g., software, microcode, or other role). Controlling access to the isolated memory region may include allowing read and write access to the isolated memory region by the I/O controller 142. Controlling access to the isolated memory region may further include allowing read access to the isolated memory region by a software component and denying write access to the isolated memory region by the software component.

Figure 3:
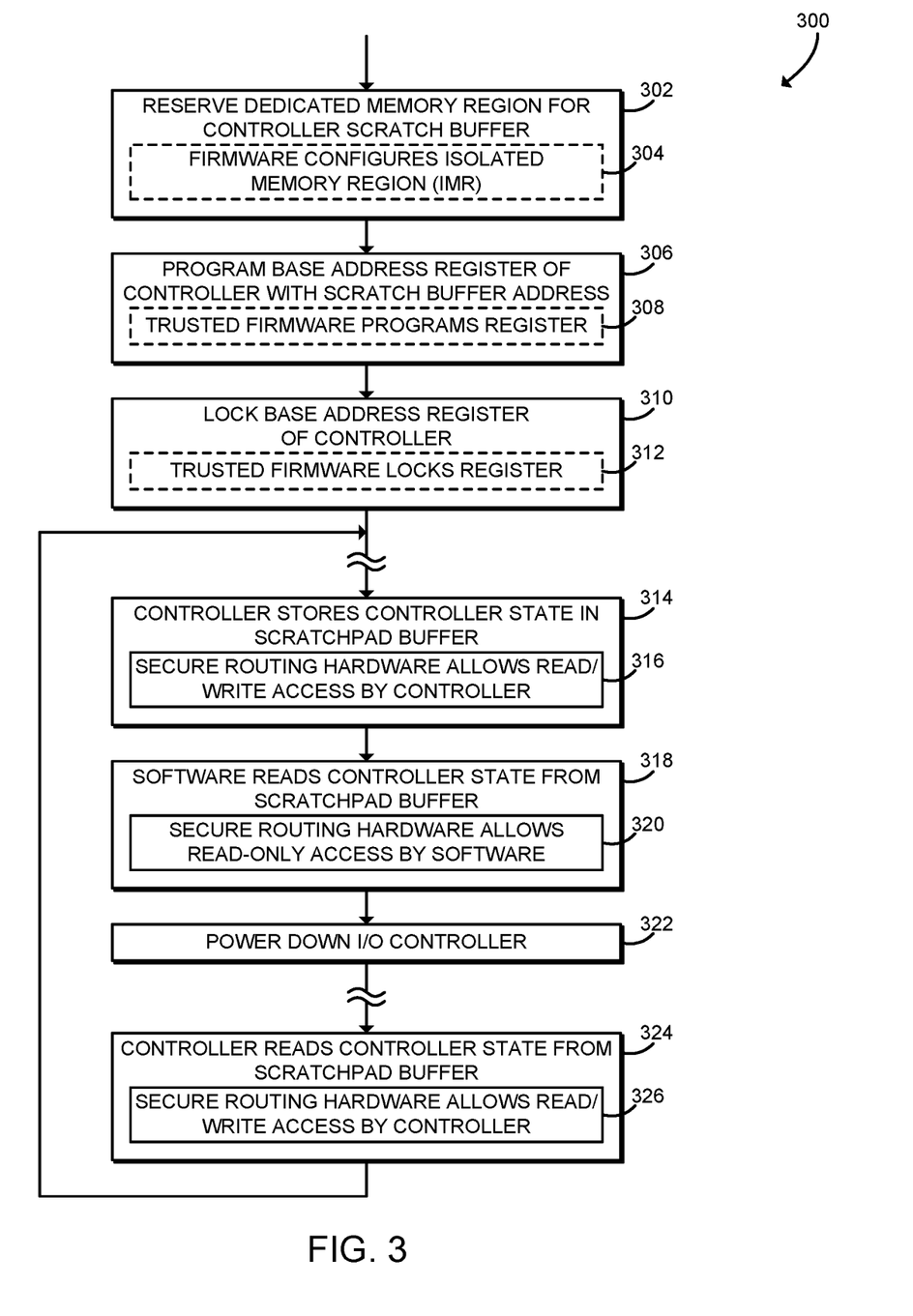
FIG. 3 is a simplified flow diagram of at least one embodiment of a method for USB controller state integrity protection that may be performed by the computing device of FIGS. 1-2.

Referring now to FIG. 3, in use, the computing device 100 may execute a method 300 for USB controller state integrity protection. In some embodiments, the operations of the method 300 may be performed by one or more components of the environment 200 of the computing device 100 as shown in FIG. 2. The method 300 begins in block 302, in which the computing device 100 reserves a dedicated memory region to contain a controller scratchpad buffer. The computing device 100 may reserve the dedicated memory region using any technique that prevents software from modifying the scratchpad buffer. In some embodiments, in block 304 the firmware environment 202 of the computing device 100 may configure an isolated memory region (IMR) to contain the controller scratchpad buffer. For example, the firmware environment 202 may configure one or more range registers or otherwise define bounds of the IMR. The IMR may be protected from unauthorized access using secure routing support of the computing device 100. For example, the secure fabric 130 may protect the IMR from unauthorized access by applying one or more security attributes of initiator (SAI) security policies.

In block 306, the computing device 100 programs the base address register 216 of an I/O controller 142 with the scratchpad buffer address. The base address register 216 may be programmed with, for example, the address of the scratchpad buffer, the starting address of the IMR that includes the scratchpad buffer, or another address that may be used by the I/O controller 142 to locate the scratchpad buffer. In some embodiments, in block 308 a trusted firmware component may program the base address register 216. The trusted firmware component (e.g., a trusted BIOS) is included in the trusted code base (TCB) of the computing device 100. Although illustrated as being programmed by firmware, in other embodiments the base address register 216 may be programmed by any trusted entity of the computing device 100.

In block 310, the computing device 100 locks the base address register 216 of the I/O controller 142. After being locked, the base address register 216 may not be further modified by untrusted and/or trusted software of the computing device 100. The base address register 216 may remain locked, for example, until a platform reset event occurs. In some embodiments, in block 312, the trusted firmware component may lock the base address register 216. Although illustrated as being locked by firmware, in other embodiments the base address register 216 may be locked by any trusted entity of the computing device 100.

After locking the base address register 216, the computing device 100 continues to operate. In particular, the computing device 100 may load and execute the operating system 204 or otherwise operate normally. During operation, the I/O controller 142 may be used to communicate with one or more I/O devices 144. For example, a USB controller 142 may be used to communicate with one or more USB devices 144, such as human input devices, mass storage devices, or other USB devices.

During operation, in block 314 the I/O controller 142 stores controller state data into the scratchpad buffer in the memory 136. The I/O controller 142 may store the controller state data, for example, to prepare for entering a low power mode or otherwise store internal state of the I/O controller 142 to support core functioning of the I/O controller 142. For example, the computing device 100 may determine to power down the I/O controller 142, in order to enter a device sleep state or other low power state. The I/O controller 142 may store the controller state prior to entering a low power state or otherwise powering down. The controller state data may include the contents of one or more control registers, device contexts, data structures, and/or other internal state of the I/O controller 142. The I/O controller 142 uses the base address register 216 to locate the scratchpad buffer in the memory 136.

In block 316, secure routing hardware of the computing device 100 allows read/write access to the scratchpad buffer by the I/O controller 142. For example, the secure fabric 130 may allow transactions from the I/O controller 142 to write to memory locations within the IMR that includes the scratchpad buffer. Each transaction initiated by the I/O controller 142 may include one or more security attributes of the initiator (SAI) that identify the I/O controller 142 as the initiator of the transaction. The secure fabric 130 may use the SAI of each transaction to identify the I/O controller 142 as the initiator, and then allow the transaction to write to the scratchpad buffer.

In block 318, software executed by the computing device 100 may read the controller state data from the scratchpad buffer. For example, the operating system 204, controller device driver 210, and/or other software executed by the processor 120 of the computing device 100 may read one or more saved registers, fields, or other controller state data from the scratchpad buffer. In block 320, the secure routing hardware of the computing device 100 allows read-only access to the scratchpad buffer by the software executed by the processor 120. For example, the secure fabric 130 may allow transactions initiated by software executed by the processor 120 to write to memory locations within the IMR that includes the scratchpad buffer. Each transaction initiated by the processor 120 may include one or more security attributes of the initiator (SAI) that identify the processor 120 as the initiator of the transaction. The SAI may further identify that the transaction was generated by software executed by the processor 120, as opposed to transactions generated by microcode or otherwise generated by the processor 120. The secure fabric 130 may use the SAI of each transaction to identify software executed by the processor 120 as the initiator, and then allow the transaction to read from the scratchpad buffer. The secure fabric 130 may deny or otherwise prohibit transactions generated by software executed by the processor 120 from writing to the scratchpad buffer.

In block 322, the computing device 100 may power down the I/O controller 142. For example, the computing device 100 may power down the I/O controller 142 and one or more I/O devices 144 in order to enter a system sleep state or other low-power state. After some time, the computing device 100 may subsequently power on the I/O controller 142, for example in response to leaving a system sleep state. Additionally, although illustrated as powering down the I/O controller 142, in some embodiments the I/O controller 142 may remain powered on.

In block 324, the I/O controller 142 reads the controller state data from the scratchpad buffer. The I/O controller 142 may, for example, restore one or more configuration registers or other device state from the scratchpad buffer or otherwise read internal state data from the scratchpad buffer. In block 326, the secure routing hardware of the computing device 100 allows read/write access to the scratchpad buffer by the I/O controller 142. As described above, the secure fabric 130 may allow transactions from the I/O controller 142 to read from or write to memory locations within the IMR that includes the scratchpad buffer. After reading the controller state data, the method 300 loops back to block 314, in which the I/O controller 142 may continue to communicate with the I/O devices 144 and/or store controller state data in the scratchpad buffer.

Figure 4:
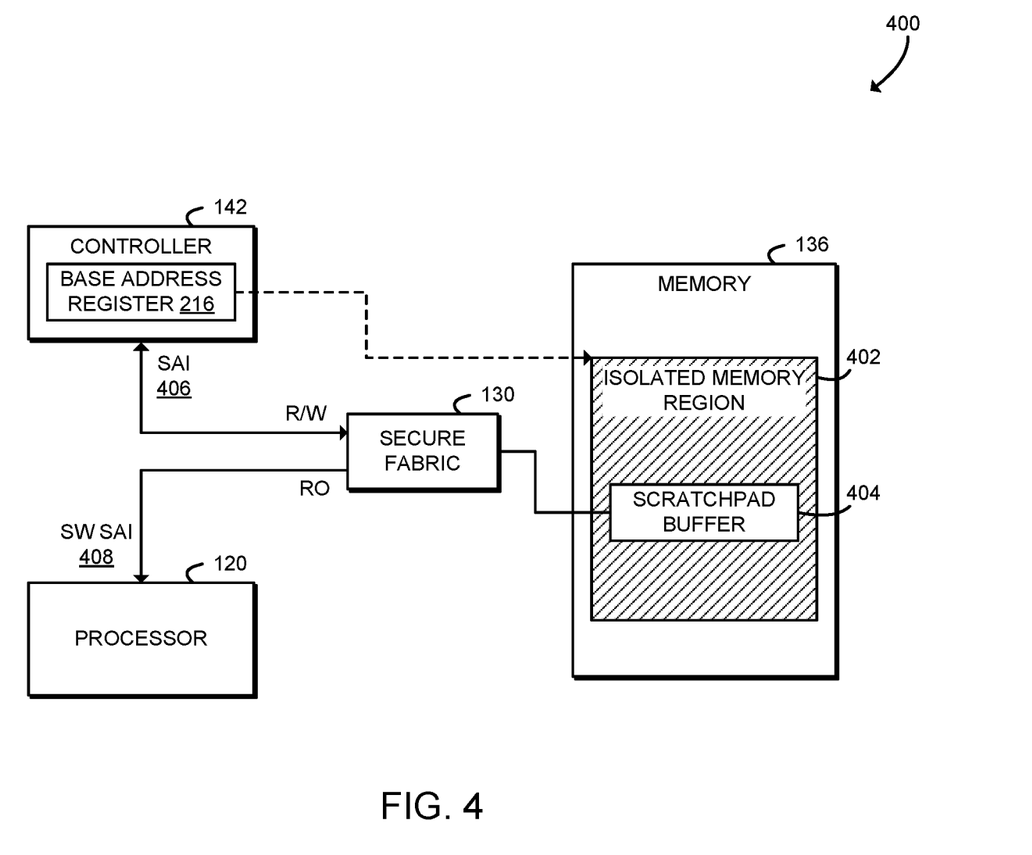
FIG. 4 is a schematic diagram illustrating memory isolation enforcement that may be performed by the computing device of FIGS. 1-2.

Referring now to FIG. 4, diagram 400 illustrates at least one potential embodiment of memory isolation enforcement that may be performed by the computing device 100. As shown, the memory 136 includes an isolated memory region 402 that includes the scratchpad buffer 404. Illustratively, the base address register 216 of the I/O controller 142 includes a pointer to the start of the isolated memory region 402. The I/O controller 142 may determine the address of the scratchpad buffer 404, for example, by adding a predetermined offset to the base address register 216. It should be understood that in some embodiments, the base address register 216 may point to the scratchpad buffer 404 directly.

As shown, the I/O controller 142 and the processor 120 may access the memory 136 via the secure fabric 130. Each of the I/O controller 142 and the processor 120 may initiate transactions to read and/or write data in the memory 136, and each transaction is tagged or otherwise identified with one or more security attributes of the initiator (SAI). As shown, the I/O controller 142 may include SAI 408 with each transaction, and the processor 120 may include SAI 410 with each transaction generated by software. As shown, the secure fabric 130 allows read/write access to the IMR 404 for transactions identified with the SAI 408 and allows read-only access to the IMR 404 for transactions identified with the SAI 410.

It should be appreciated that, in some embodiments, the method 300 may be embodied as various instructions stored on a computer-readable media, which may be executed by the processor 120, the I/O subsystem 128, the I/O controller 142, and/or other components of the computing device 100 to cause the computing device 100 to perform the method 300. The computer-readable media may be embodied as any type of media capable of being read by the computing device 100 including, but not limited to, the memory 136, the data storage device 138, firmware devices, other memory or data storage devices of the computing device 100, portable media readable by a peripheral device 144 of the computing device 100, and/or other media.

EXAMPLES

Illustrative examples of the technologies disclosed herein are provided below. An embodiment of the technologies may include any one or more, and any combination of, the examples described below.

Example 1 includes a computing device for integrity protection of controller state, the computing device comprising: an I/O controller comprising a base address register and a controller state manager; a secure routing manager; a memory isolation manager to reserve an isolated memory region in a memory of the computing device; and a controller configuration manager to (i) program the base address register of an I/O controller of the computing device with an address of the isolated memory region and (ii) lock the base address register in response to programming of the base address register; wherein the controller state manager of the I/O controller is to store controller state data in a scratchpad buffer located in the isolated memory region in response to locking of the base address register; and wherein the secure routing manager is to control, by secure routing hardware of the computing device, access to the isolated memory region in response to storage of the controller state data.

Example 2 includes the subject matter of Example 1, and wherein to program the base address register comprises to program the base address register by a trusted entity of the computing device.

Example 3 includes the subject matter of any of Examples 1 and 2, and wherein the trusted entity comprises a trusted firmware component.

Example 4 includes the subject matter of any of Examples 1-3, and wherein the I/O controller comprises a USB controller.

Example 5 includes the subject matter of any of Examples 1-4, and wherein to control the access to the isolated memory region comprises to control the access as a function of a security attribute of an initiator of the access to the isolated memory region.

Example 6 includes the subject matter of any of Examples 1-5, and wherein the security attribute of the initiator comprises an identity of the initiator.

Example 7 includes the subject matter of any of Examples 1-6, and wherein the security attribute of the initiator comprises a role of the initiator.

Example 8 includes the subject matter of any of Examples 1-7, and wherein to control access to the isolated memory region comprises to allow write access to the isolated memory region by the I/O controller in response to the storage of the controller state data in the scratchpad buffer.

Example 9 includes the subject matter of any of Examples 1-8, and wherein: the controller state manager of the I/O controller is further to load the controller state data from the scratchpad buffer; and to control access to the isolated memory region comprises to allow read access to the isolated memory region by the I/O controller in response to loading of the controller state data from the scratchpad buffer.

Example 10 includes the subject matter of any of Examples 1-9, and further comprising: a power manager to (i) power down the I/O controller in response to the storage of the controller state data, and (ii) power on the I/O controller in response to powering down of the I/O controller; wherein to load the controller state data comprises to load the controller state data in response to powering on of the I/O controller.

Example 11 includes the subject matter of any of Examples 1-10, and further comprising: a controller device driver to load, by a software component executed by the computing device, the controller state data from the scratchpad buffer in response to the storage of the controller state data; wherein to control access to the isolated memory region comprises to allow read access to the isolated memory region by the software component in response to loading of the controller state data from the scratchpad buffer.

Example 12 includes the subject matter of any of Examples 1-11, and wherein to control access to the isolated memory region further comprises to deny write access to the isolated memory region by the software component.

Example 13 includes the subject matter of any of Examples 1-12, and further comprising a firmware environment, wherein the firmware environment comprises the memory isolation manager.

Example 14 includes a method for integrity protection of controller state, the method comprising: reserving, by a computing device, an isolated memory region in a memory of the computing device; programming, by the computing device, a base address register of an I/O controller of the computing device with an address of the isolated memory region; locking, by the computing device, the base address register in response to programming the base address register; storing, by the I/O controller, controller state data in a scratchpad buffer located in the isolated memory region in response to locking the base address register; and controlling, by secure routing hardware of the computing device, access to the isolated memory region in response to storing the controller state data.

Example 15 includes the subject matter of Example 14, and wherein programming the base address register comprises programming the base address register by a trusted entity of the computing device.

Example 16 includes the subject matter of any of Examples 14 and 15, and wherein the trusted entity comprises a trusted firmware component.

Example 17 includes the subject matter of any of Examples 14-16, and wherein the I/O controller comprises a USB controller.

Example 18 includes the subject matter of any of Examples 14-17, and wherein controlling the access to the isolated memory region comprises controlling the access as a function of a security attribute of an initiator of the access to the isolated memory region.

Example 19 includes the subject matter of any of Examples 14-18, and wherein the security attribute of the initiator comprises an identity of the initiator.

Example 20 includes the subject matter of any of Examples 14-19, and wherein the security attribute of the initiator comprises a role of the initiator.

Example 21 includes the subject matter of any of Examples 14-20, and wherein controlling access to the isolated memory region comprises allowing write access to the isolated memory region by the I/O controller in response to storing the controller state data in the scratchpad buffer.

Example 22 includes the subject matter of any of Examples 14-21, and further comprising: loading, by the I/O controller, the controller state data from the scratchpad buffer; wherein controlling access to the isolated memory region comprises allowing read access to the isolated memory region by the I/O controller in response to loading the controller state data from the scratchpad buffer.

Example 23 includes the subject matter of any of Examples 14-22, and further comprising: powering down the I/O controller in response to storing the controller state data; and powering on the I/O controller in response to powering down the I/O controller; wherein loading the controller state data comprises loading the controller state data in response to powering on the I/O controller.

Example 24 includes the subject matter of any of Examples 14-23, and further comprising: loading, by a software component executed by the computing device, the controller state data from the scratchpad buffer in response to storing the controller state data; wherein controlling access to the isolated memory region comprises allowing read access to the isolated memory region by the software component in response to loading the controller state data from the scratchpad buffer.

Example 25 includes the subject matter of any of Examples 14-24, and wherein controlling access to the isolated memory region further comprises denying write access to the isolated memory region by the software component.

Example 26 includes the subject matter of any of Examples 14-25, and wherein reserving the isolated memory region comprises configuring the isolated memory region by a firmware environment of the computing device.

Example 27 includes a computing device comprising: a processor; and a memory having stored therein a plurality of instructions that when executed by the processor cause the computing device to perform the method of any of Examples 14-26.

Example 28 includes one or more non-transitory, computer readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for integrity protection of controller state, the computing device comprising: means for reserving an isolated memory region in a memory of the computing device; means for programming a base address register of an I/O controller of the computing device with an address of the isolated memory region; means for locking the base address register in response to programming the base address register; means for storing, by the I/O controller, controller state data in a scratchpad buffer located in the isolated memory region in response to locking the base address register; and means for controlling, by secure routing hardware of the computing device, access to the isolated memory region in response to storing the controller state data.

Example 31 includes the subject matter of Example 30, and wherein the means for programming the base address register comprises means for programming the base address register by a trusted entity of the computing device.

Example 32 includes the subject matter of any of Examples 30 and 31, and wherein the trusted entity comprises a trusted firmware component.

Example 33 includes the subject matter of any of Examples 30-32, and wherein the I/O controller comprises a USB controller.

Example 34 includes the subject matter of any of Examples 30-33, and wherein the means for controlling the access to the isolated memory region comprises means for controlling the access as a function of a security attribute of an initiator of the access to the isolated memory region.

Example 35 includes the subject matter of any of Examples 30-34, and wherein the security attribute of the initiator comprises an identity of the initiator.

Example 36 includes the subject matter of any of Examples 30-35, and wherein the security attribute of the initiator comprises a role of the initiator.

Example 37 includes the subject matter of any of Examples 30-36, and wherein the means for controlling access to the isolated memory region comprises means for allowing write access to the isolated memory region by the I/O controller in response to storing the controller state data in the scratchpad buffer.

Example 38 includes the subject matter of any of Examples 30-37, and further comprising: means for loading, by the I/O controller, the controller state data from the scratchpad buffer; wherein the means for controlling access to the isolated memory region comprises means for allowing read access to the isolated memory region by the I/O controller in response to loading the controller state data from the scratchpad buffer.

Example 39 includes the subject matter of any of Examples 30-38, and further comprising: means for powering down the I/O controller in response to storing the controller state data; and means for powering on the I/O controller in response to powering down the I/O controller; wherein the means for loading the controller state data comprises means for loading the controller state data in response to powering on the I/O controller.

Example 40 includes the subject matter of any of Examples 30-39, and further comprising: means for loading, by a software component executed by the computing device, the controller state data from the scratchpad buffer in response to storing the controller state data; wherein the means for controlling access to the isolated memory region comprises means for allowing read access to the isolated memory region by the software component in response to loading the controller state data from the scratchpad buffer.

Example 41 includes the subject matter of any of Examples 30-40, and wherein the means for controlling access to the isolated memory region further comprises means for denying write access to the isolated memory region by the software component.

Example 42 includes the subject matter of any of Examples 30-41, and wherein the means for reserving the isolated memory region comprises means for configuring the isolated memory region by a firmware environment of the computing device.

The invention claimed is:

1. A computing device for integrity protection of controller state, the computing device comprising:
   an I/O controller comprising a base address register and a controller state manager;
   a secure routing manager;
   a memory isolation manager to reserve an isolated memory region in a memory of the computing device; and
   a controller configuration manager to (i) program the base address register of an I/O controller of the computing device with an address of the isolated memory region and (ii) lock the base address register in response to programming of the base address register;
   wherein the controller state manager of the I/O controller is to store controller state data in a scratchpad buffer located in the isolated memory region in response to locking of the base address register and load the controller state data from the scratchpad buffer; and
   wherein the secure routing manager is to allow, by secure routing hardware of the computing device, read access to the isolated memory region by the I/O controller in response to loading of the controller state data from the scratchpad buffer.

2. The computing device of claim 1, wherein to program the base address register comprises to program the base address register by a trusted entity of the computing device.

3. The computing device of claim 2, wherein the trusted entity comprises a trusted firmware component.

4. The computing device of claim 1, wherein the I/O controller comprises a USB controller.

5. The computing device of claim 1, wherein the secure routing hardware is further to control the access to the isolated memory region as a function of a security attribute of an initiator of the access to the isolated memory region.

6. The computing device of claim 1, wherein the secure routing hardware is further allow write access to the isolated memory region by the I/O controller in response to the storage of the controller state data in the scratchpad buffer.

7. The computing device of claim 1, further comprising:
   a power manager to (i) power down the I/O controller in response to the storage of the controller state data, and (ii) power on the I/O controller in response to powering down of the I/O controller;
   wherein to load the controller state data comprises to load the controller state data in response to powering on of the I/O controller.

8. The computing device of claim 1, further comprising:
   a controller device driver to load, by a software component executed by the computing device, the controller state data from the scratchpad buffer in response to the storage of the controller state data.

9. The computing device of claim 8, wherein the secure routing hardware is further to deny write access to the isolated memory region by the software component.

10. The computing device of claim 1, further comprising a firmware environment, wherein the firmware environment comprises the memory isolation manager.

11. A method for integrity protection of controller state, the method comprising:
    reserving, by a computing device, an isolated memory region in a memory of the computing device;
    programming, by the computing device, a base address register of an I/O controller of the computing device with an address of the isolated memory region;
    locking, by the computing device, the base address register in response to programming the base address register;
    storing, by the I/O controller, controller state data in a scratchpad buffer located in the isolated memory region in response to locking the base address register;
    loading, by the I/O controller, the controller state data from the scratchpad buffer; and
    allowing, by secure routing hardware of the computing device, read access to the isolated memory region by the I/O controller in response to loading the controller state data from the scratchpad buffer.

12. The method of claim 11, wherein the I/O controller comprises a USB controller.

13. The method of claim 11, wherein further comprising controlling access to the isolated memory region as a function of a security attribute of an initiator of the access to the isolated memory region.

14. The method of claim 11, further comprising allowing write access to the isolated memory region by the I/O controller in response to storing the controller state data in the scratchpad buffer.

15. The method of claim 11, further comprising:
    loading, by a software component executed by the computing device, the controller state data from the scratchpad buffer in response to storing the controller state data;
    allowing read access to the isolated memory region by the software component in response to loading the controller state data from the scratchpad buffer.

16. The method of claim 15, further comprising denying write access to the isolated memory region by the software component.

17. One or more non-transitory, computer-readable storage media comprising a plurality of instructions stored thereon that, in response to being executed, cause a computing device to:
    reserve an isolated memory region in a memory of the computing device;
    program a base address register of an I/O controller of the computing device with an address of the isolated memory region;
    lock the base address register in response to programming the base address register;
    store, by the I/O controller, controller state data in a scratchpad buffer located in the isolated memory region in response to locking the base address register; and
    load, by the I/O controller, the controller state data from the scratchpad buffer; and
    allow, by secure routing hardware of the computing device, read access to the isolated memory region by the I/O controller in response to loading the controller state data from the scratchpad buffer.

18. The one or more non-transitory, computer-readable storage media of claim 17, wherein the I/O controller comprises a USB controller.

19. The one or more non-transitory, computer-readable storage media of claim 17, wherein the plurality of instructions, in response to being executed, further cause the computing device to control access to the isolated memory region as a function of a security attribute of an initiator of the access to the isolated memory region.

20. The one or more non-transitory, computer-readable storage media of claim 17, wherein the plurality of instructions, in response to being executed, further cause the computing device to allow write access to the isolated memory region by the I/O controller in response to storing the controller state data in the scratchpad buffer.

21. The one or more non-transitory, computer-readable storage media of claim 17, further comprising a plurality of instructions stored thereon that, in response to being executed, cause the computing device to:
load, by a software component executed by the computing device, the controller state data from the scratchpad buffer in response to storing the controller state data;
read access to the isolated memory region by the software component in response to loading the controller state data from the scratchpad buffer.

22. The one or more non-transitory, computer-readable storage media of claim 21, wherein the plurality of instructions, in response to being executed, further cause the computing device to deny write access to the isolated memory region by the software component.

* * * * *